US006127019A

United States Patent [19]

Means

[11] Patent Number: 6,127,019

[45] Date of Patent: Oct. 3, 2000

[54] BRACED ART SURFACE

[76] Inventor: Robert C. Means, 231 Lansdowne Ave., Decatur, Ga. 30030

[21] Appl. No.: 09/345,230

[22] Filed: Jun. 30, 1999

[51] Int. Cl.[7] .......... B32B 3/08

[52] U.S. Cl. .......... 428/120; 428/119; 160/379

[58] Field of Search .......... 428/119, 120; 160/379

[56] References Cited

U.S. PATENT DOCUMENTS 4,065,596 12/1977 Groody .......... 428/215

4,207,366 6/1980 Tyler .......... 428/73

*Primary Examiner*—Alexander S. Thomas

[57] ABSTRACT

A rigid braced art surface that will support sculptural objects, metal fasteners, foams, paints, plasters, and the like. The braced art surface consists of a rigid working surface supported by back bracing that runs horizontally, vertically, and diagonally, with corner supports. The resulting system of bracing, along with the permanent fastening of the surface to the bracing, results in a surface that is dimensionally stable, twist and warp resistant. As an braced art surface of rigid and strong construction, one can apply paint, scrape or cut, attach objects, or apply plasters and foams to it with no concern for compromising the structural integrity of the surface.

6 Claims, 6 Drawing Sheets

BRACED ART SURFACE

CROSS-REFERENCE TO RELATED APPLICATION

Not applicable

BACKGROUND

1. Field of Invention

This invention relates to art surfaces as used traditionally by artists, but also in modern applications whereby an artist may attach or fasten sculptural elements or uncommon grounds to an art surface.

2. Description of Prior Art

Heretofore artists used fabric stretched over frames or boards laminated with various materials for painting with oils and acrylics. In today's market, there is a demand for an art surface available in large and small sizes to which media other than, but including paint, can be applied or fastened. These other media run the range from expanding foams, thick plasters, to sheet goods, and found objects. The attachment and use of such media requires an art surface strong enough to support such media. The art surface must remain dimensionally stable, yet strong, and provide the artist with liberal access to the rear of the art surface for easy installation of fasteners.

The conventional stretched fabric will provide the artist with a large, seamless surface. This surface does little to provide the artist with a structure to which the artist can securely attach fastening hardware. Fabric will not withstand the aggressive use of scrapers, or knives used to intentionally cut into the surface. The flexible nature of stretched fabric, along with the frabric's tendency to expand and contract with humidity, does not provide a stable surface for thick plasters, expanding foams, and the like.

Canvas boards are of a more rigid nature than canvas, but are prone to bowing once the media has been applied. They have no seperate mechanism of support and rely on the frames into which they are placed for stability. Once installed, there is nothing to prevent the inevitable bowing. Canvas boards are constructed of cardboard and canvas and do not provide a substantial structure into which an artist may screw or bolt objects.

Other types of art boards have been proposed, for example, U.S. Pat. No. 4,065,596 to Groody (1977) and U.S. Pat. No. 4,207,366 to Tyler (1980).

Groody's patent addresses the issue of providing a rigid surface while retaining the flexibility of touch of the artist's brush to the canvas. Many of today's artists find the flexibility of canvas annoying, especially with the more common use of mixed media in painting, such as oil crayons, markers, pencils, knives, scrapers, and any medium which requires pressure to apply. The stability of this surface is subject to a stiffener to which all else is laminated. The stiffener has no structural support to prevent it from warping or twisting. The backside of the board provides no standoffs where bolts, nuts, screws and fasteners can penetrate without interfering with the wall on which the surface is hung, or on which the surface is laid. In addition, the surface strength is limited to the outer layer of paper or fabric laminated to the substructure.

Tyler's invention does address the issue of warping and twisting. Its honeycomb substructure provides a rigid board, but is not of a design conducive to penetration of hardware at random locations. The paintable surface is a series of laminated papers constructed to prevent delamination with the application of art liquids, such as watercolors. This surface is clearly for lightweight materials, such as paintings, watercolors, and the mounting of photographs. It would be unsuitable for applications of heavy media such as plaster. As in the case with Groody's patent, further structure to allow the surface to stand off from the wall would be required for the protrusion of hardware through the surface.

Other types of rigid art surfaces in public use are usually hammered together by the end user. They are normally a sheet of ¼ inch plywood nailed onto a rectangular frame of wood 2×2s. This basic design offers no resistance to twisting or warping. The larger sizes more commonly used, are more likely to experience this deformity.

SUMMARY

The present invention is a dimensionally stable, non-warping art surface. Its workable surface is supported on the backside by a series of braces around the workable surface's perimeter with the addition of diagonal bracing and corner bracing. The diagonal bracing adds substantial strength and resistance to warping and twisting in all directions, especially along the diagonal of the working surface. This allows for the use of thinner and lighter bracing members. This configuration allows maximum open space for protruding fasteners yet provides maximum stability within the structure itself Objects and Advantages Accordingly, several objects and advantages of the present invention are:

(a) to provide the artist with a rigid surface that will support all types of applied media.

(b) to provide the artist with a surface which requires no assembly, no additional support, no frabric, and no frame.

(c) to provide the artist with a surface that is structurally solid and suitable for heavy use, yet light in weight in relationship to its size and strength.

(d) to provide the artist with a surface that is superior in its resistance to shrinkage, flexing, bowing, warping, and twisting.

(e) to provide the artist with a surface that is archival at a relatively low cost.

(f) to provide the artist with a rigid surface that will not give under the pressure of oil crayons, pencils, markers, knives, or other media that require pressure to apply.

(g) to provide the artist with a surface that will retain structural integrity despite being scraped, gouged, or partially cut away.

(h) to provide the artist with all the above advantages on surfaces of varying sizes.

REFERENCE NUMERALS IN DRAWINGS

| | |
|---|---|
| 10 | working surface |
| 11a, 11b, 11c, 11d | horizontal and vertical elongated brace members |
| 12a, 12b, 12c, 12d | corner brace members |
| 13a, 13b, 13c, 13d | diagonal elongated brace members |

DESCRIPTION-FIGS. 1–6-EMBODIMENT

Specific reference will now be made to the drawings. Closely related or similar parts have the same reference number with different suffixes to differentiate the individual members. The same reference numbers are used for corresponding elements throughout.

Figure 1:
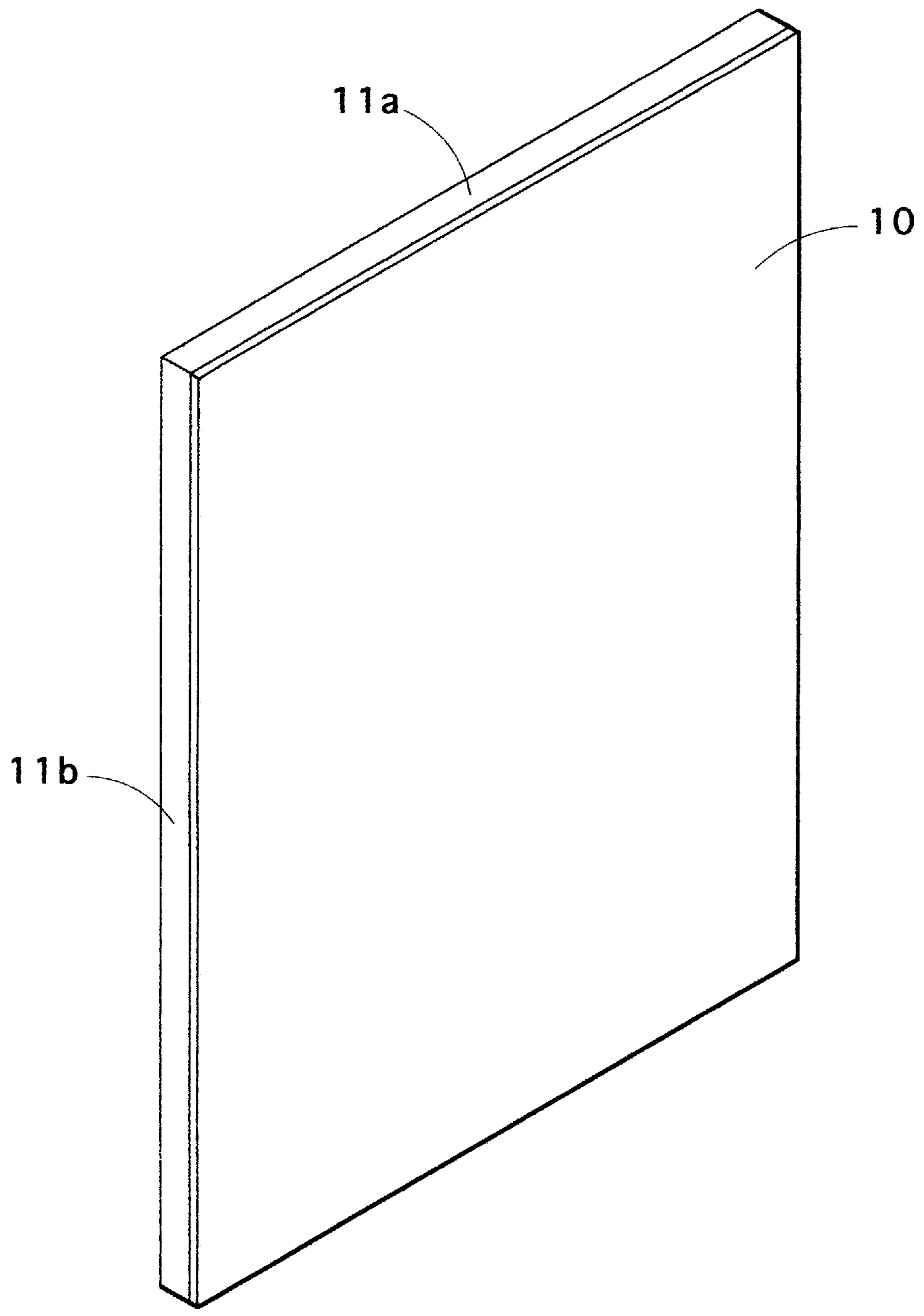
FIG. 1 shows a front view of a braced art surface.
Figure 2:
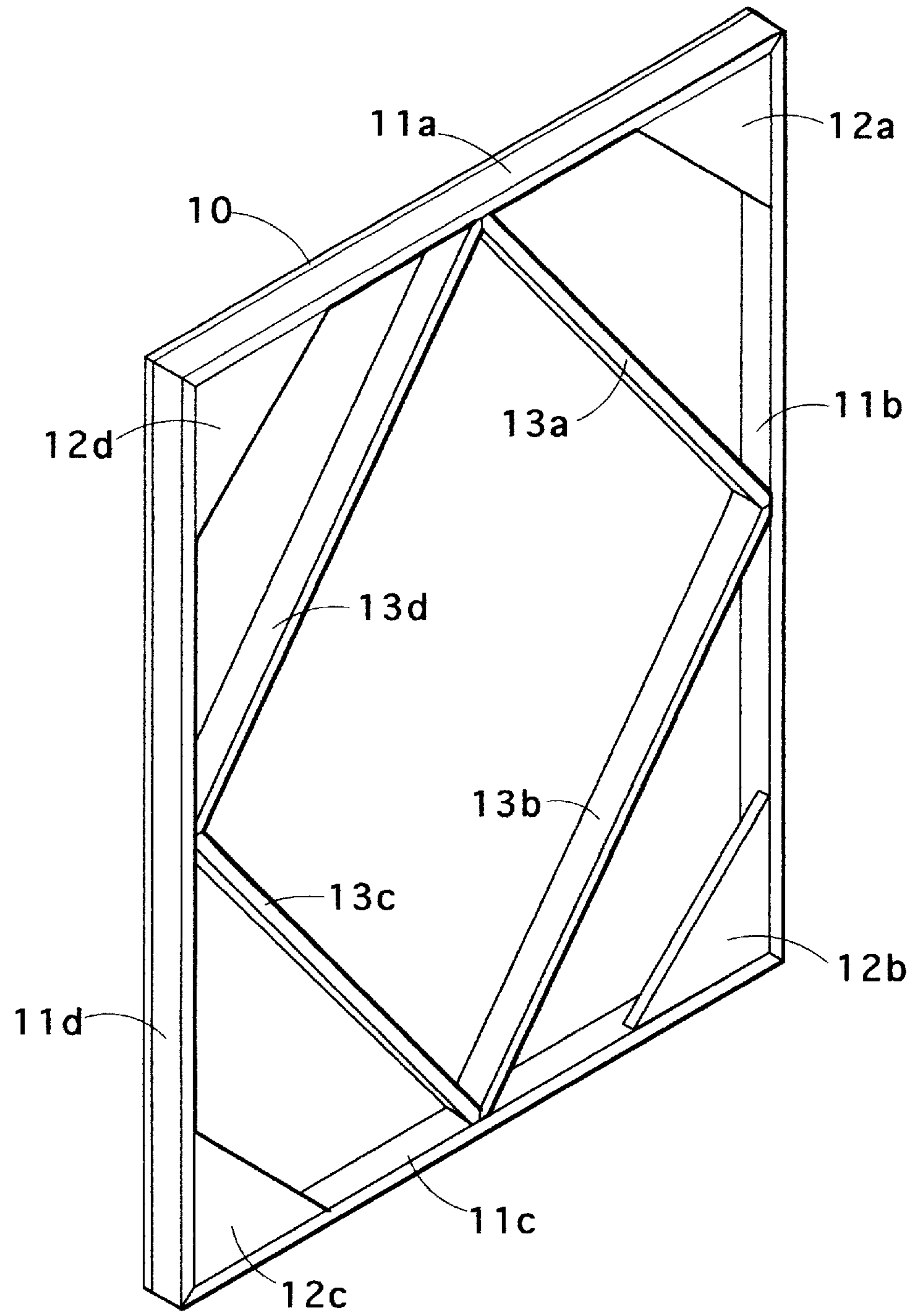
FIG. 2 shows a rear view of a braced art surface.

A braced art surface in final composite is shown in FIG. 1, front view, and FIG. 2, rear view.

FIG. 1 shows a front view of a working surface 10. A working surface can be made of any suitable flat and rigid material such as plywood, lauan, fiberboard, composite board and the like. Thickness thereof can vary typically between ⅛ inch to ¾ inch but must be substantially rigid relative to a bracing structure (FIG. 4).

Figure 3:
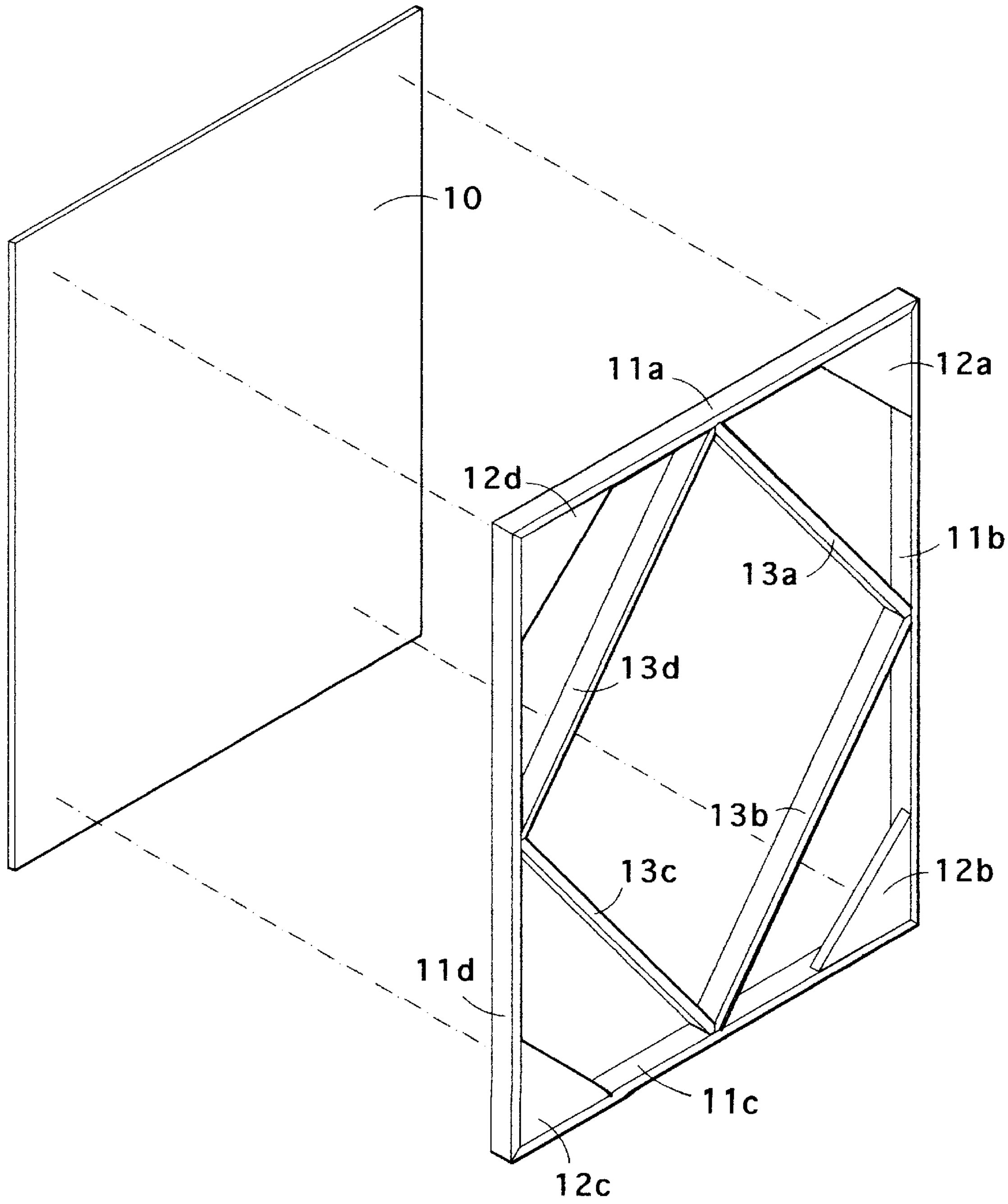
FIG. 3 shows an exploded view of a working surface detached from a bracing structure.
Figure 4:
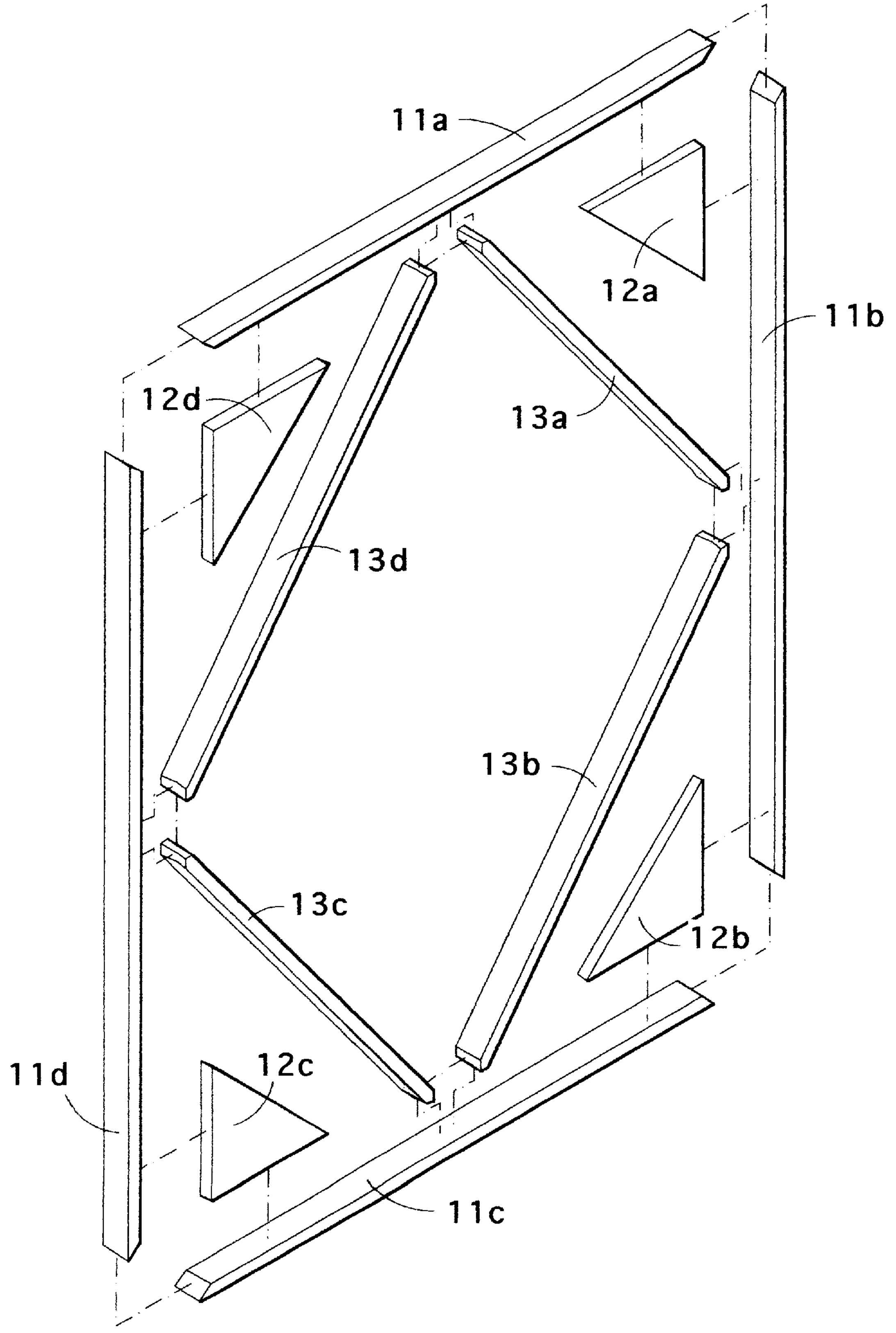
FIG. 4 shows an exploded view of a braced art surface bracing structure.

FIG. 3 shows an exploded view of the working surface 10 separated from a bracing structure, (FIG. 4). The outer dimension of the bracing structure is equal to that of the working surface 10. The working surface 10 is attached to the bracing structure so that the working surface is flush to the outermost edges of the bracing structure (FIG. 2). The working surface 10 is typically attached by use of wood glue. Other suitable adhesives such as epoxies, contact cements, and the like can be used. The surface attachment can be reinforced by use of fasteners. Typically, 18 gauge, ¼ inch crown staples, ¾ inch to 1¼ inch can be used. Other size and types of fasteners, such as staples, nails, screws, and the like can be used.

FIG. 4 shows an exploded view of the bracing structure for the working surface. A bracing structure is made of a series of elongated brace members. Brace members 11*a*, 11*b*, 11*c*, and 11*d* create an outer brace frame. Brace members 13*a*, 13*b*, 13*c*, and 13*d* create a diagonal inner brace frame. Corner braces 12*a*, 12*b*, 12*c*, and 12*d* support the corners of the outer brace frame.

The elongated brace members 11*a*–11*d* that create the outer brace frame and the brace members 13*a*–13*d* that create the inner brace frame can be made of plywood typically ½ inch to ¾ inch thick. The brace members could also be made of wood, composite board and the like. Typically, all brace members have a depth that is a minimum of twice their width. The width of all brace members are attached flush to the working surface 10 (FIG. 3).

The elongated brace members of the outer brace frame 11*a*–11*d* are joined to define a rectangle. The rectangle can vary in size. Brace member 11*a* is attached to brace member 11*b* at a right angle. The attachment point can be mitered, as in FIG. 4, fingered joined, butt joined, and the like. The joints of the brace members can be joined with wood glue, or a suitable adhesive. Typically, 16 gauge, 1½ inch nails are used to reinforce the joint. Fasteners such as screws, staples, and the like can be used. Brace member 11*c* is then attached to brace member 11*b*. Brace member 11*d* is then attached to brace member 11*c* and brace member 11*a*, completing the rectangle.

Figure 5:
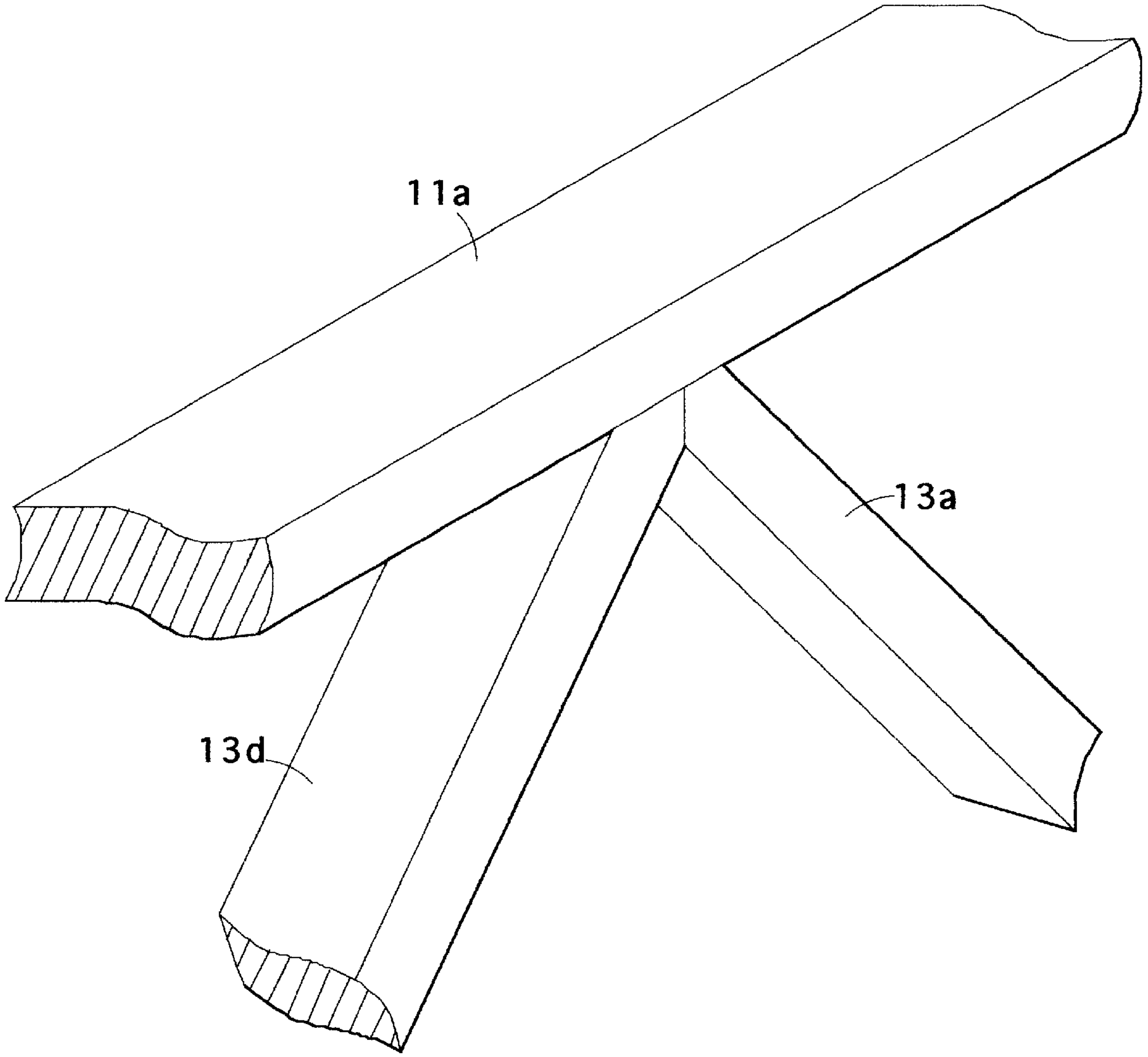
FIG. 5 shows a detail of a inner bracing joint.

The inner brace members, 13*a*–13*d* are joined to define an inner diamond shaped frame. These brace members 13*a*–13*d* are double mitered at the ends so there is a flush fit when joined to each other, and when joined into the outer frame (FIG. 5). Brace member 13*a* is attached to the inside midpoint of brace members 11*a* and 11*b*. 13*b* is attached in like fashion to 11*b* and 11*c*. 13*c* is attached in like fashion to 11*c* and 11*d*. 13*d* is attached in like fashion to 11*d* and 11*a* completing the inner diamond shaped frame. These can be fastened by use of suitable adhesives and fasteners, as are the outer brace members 11*a*–11*d*.

Figure 6:
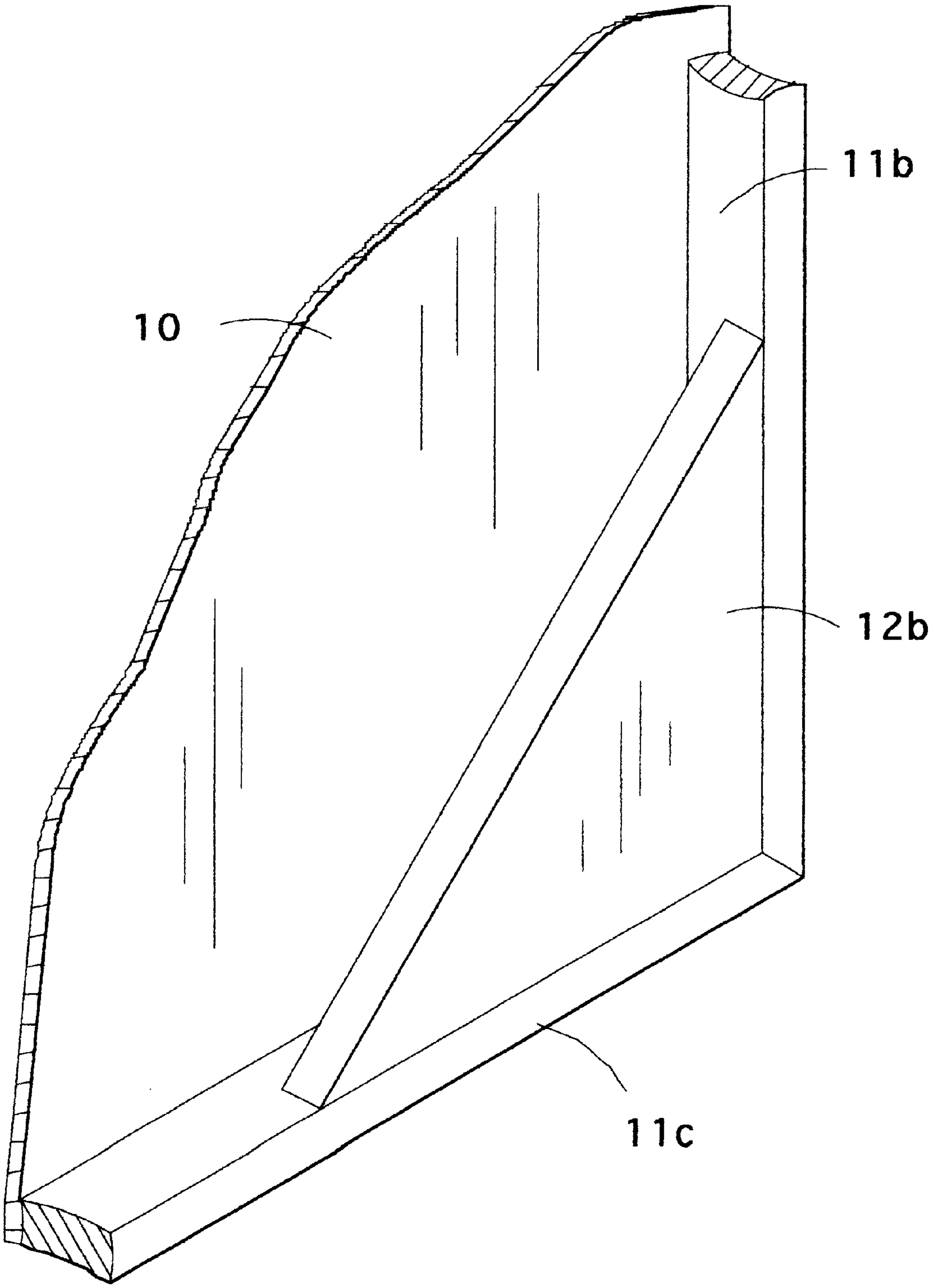
FIG. 6 shows a detail of a corner brace.

Corner brace members 12*a*–12*d* are attached into the corners of the outer frame 11*a*–11*d*. They are attached within the bracing structure to the back side of the art surface 10 (FIG. 6). The corner brace members can be made of wood, plywood, composite board and the like. The joints of the brace members can be joined with wood glue, or a suitable adhesive. Typically, 16 gauge, 1½ inch nails are used to reinforce the joint. Fasteners such as screws, staples, and the like can be used.

The thickness of the corner braces is typically ½ inch to ¾ inch. The length and width of the corner braces can vary in relationship to the size of the braced art surface.

Operation-FIGS. 1–6

The working surface 10 accepts the media as applied by the artist. The working surface being the face of the braced artist surface from which the final art will be viewed. The working surface accepts mechanical fasteners, the addition of sculptural elements, and the use of foams, heavy plasters, and the like. The working surface is of rigid material, but depends on the whole of the bracing structure for strength and stability (FIG. 4).

The bracing structure being comprised of all the elements in FIG. 4 holds the working surface 10 rigid. It also allows maximum support to prevent twisting or warping while allowing access to the majority of the working surface from the rear.

The brace members 11*a*–11*d* fully support the perimeter of the working surface. The working surface is flush to the edge of the outer brace members. This creates a smooth edge to the braced art surface that can be finished, painted, or framed. The outer brace members help prevent horizontal and vertical warping.

The outer brace frame is reinforced by use of the corner brace members 12*a*–12*d*. The corner brace members are additional support to keep the working surface 10 square. They lessen the flexibility of the outer brace members 11*a*–11*d* across their length and width. By being placed against the backside of the bracing structure (FIG. 6), rearward of the working surface, they add additional support to help prevent twisting or warping of the surface.

The inner brace members 13*a*–13*d* are of vital importance. These diagonally placed brace members counteract the tendency of the surface to twist or warp especially along the surface's diagonal. Twisting or warping along the diagonal is the most common deformity of art surfaces. The double mitered edges (FIG. 5) of the inner brace members 13*a*–13*d* allow the brace members to be assembled into a diamond shape by creating a flush surface for each member to attach to the next. It also leaves a flat surface at each corner of the diamond shaped bracing that will seat flush to the outer braces 11*a*–11*d*. The diagonal inner brace members support the weakest points of the outer brace members 11*a*–11*d*, which are the center points.

Conclusion, Ramifications, and Scope of Invention

Thus, the reader can see that the braced art surface of the invention provides a highly reliable, strong, dimensionally stable surface that can be used for multiple purposes. Furthermore, the braced art surface had additional advantage in that;

it provides the artist with a surface on which objects can be fastened or attached with an array of adhesives or mechanical fasteners.

it provides the artist with a rigid surface that will not flex under the pressure of oil crayons. pencils, markers, or other media that require pressure to apply.

it provides the artist with a recess in the rear of the working surface to accept protrusions through the working surface by objects, fasteners, etc., without extending past the rear of the art surface.

it allows the artist to use scrapers, knives, and like abrasive tools to scratch into the working surface itself with no loss of structural integrity.

it provides the artist with a working surface from which portions can be cut, or removed with little loss of structural integrity.

it provides the artist with a surface that requires no assembly, no additional parts or fabrics; In effect, ready to use.

While my above description contains specifications, these should not be construed as limitations on the scope of the invention, but rather as exemplification of one preferred embodiment thereof. Many other variations are possible. For example the corner brace members could be inset into the elongated brace members within a mitered slot, or flush mounted onto the back of the braced art surface. The materials can be of metal or plastic extrusions and surface. The inner brace members that form the diamond shape could be of a lesser depth and width than that of the outer brace members, allowing additional space for hanging devices such as eyelets, picture wire, cleats of various types, fingered metal wall clips, and the like. The depth of all elongated braces members can be less than twice the dimension of ther width.

Accordingly, the scope of the invention should be determined not by the embodiment illustrated, but by the appended claims and their legal equivalents.

I claim:

1. A readily assembled, dimensionally stable, warp-resistant, braced art surface, comprising in combination:

(a) a flat rigid working surface (b) a bracing structure for said flat rigid working surface which comprises:

i. a plurality of elongated brace members with abutting end portions cooperatively joined to define a rectangular structure ii. a plurality of elongated brace members with abutting mitered end portions cooperatively joined to define a diamond-shaped polygon structure whose corners attach to the inside midpoint of the brace members which comprise said rectangular structure iii. a plurality of corner braces attached within the corners of said rectangular structure (c) means for joining said all members of said bracing structure together (d) means for joining said bracing structure to said working surface.

2. The braced art surface of claim 1 wherein said flat rigid working surface is plywood about ⅛ inch to ¾ inch thick.

3. The braced artist's surface of claim 1 wherein said elongated brace members are plywood about ½ inch to ¾ inch thick wide, the depth of the brace member being a minimum of twice it's width.

4. The braced art surface of claim 1 wherein said corner bracing is plywood about ½ inch to ¾ inch thick.

5. The braced art surface of claim 1 wherein said means for joining all bracing members of said bracing sturcture comprises a wood glue and about 16 gauge nails about 1½ inches in length.

6. The braced art surface of claim 1 wherein said means for joining said working surface to said bracing structure comprises a wood glue and about 18 gauge ¼ inch crown staples about ¾ inch to 1¼ inches in length.

* * * * *